United States Patent
Fransen et al.

(10) Patent No.: US 6,775,773 B1
(45) Date of Patent: Aug. 10, 2004

(54) PROTECTEDLY READING OUT AN ENCIPHERED, CRYPTOGRAPHIC KEY

(75) Inventors: Frank Fransen, Groningen (NL); Reinder Wolthuis, Haren (NL); Jeroen Döll, Madrid (ES)

(73) Assignee: Koninklijke KPN N.V. (NL)

( * ) Notice: Subject to any disclaimer, the term of this patent is extended or adjusted under 35 U.S.C. 154(b) by 0 days.

(21) Appl. No.: 09/530,280
(22) PCT Filed: Nov. 5, 1998
(86) PCT No.: PCT/EP98/07211
§ 371 (c)(1),
(2), (4) Date: Jun. 12, 2000
(87) PCT Pub. No.: WO99/24943
PCT Pub. Date: May 20, 1999

(30) Foreign Application Priority Data

Nov. 7, 1997 (NL) .............................................. 1007495

(51) Int. Cl.$^7$ ............................ G06F 13/00; H04L 9/00
(52) U.S. Cl. ........................ 713/171; 713/170; 713/169; 713/182; 380/284; 380/286
(58) Field of Search ............................... 713/171, 170, 713/169, 168, 182, 150; 380/284, 286

(56) References Cited

U.S. PATENT DOCUMENTS

| 5,673,318 A | * | 9/1997 | Bellare et al. .............. 713/170 |
| 5,703,952 A | * | 12/1997 | Taylor ........................ 380/44 |
| 5,757,913 A | * | 5/1998 | Bellare et al. .............. 713/168 |
| 5,982,896 A | * | 11/1999 | Cordery et al. ............... 705/62 |
| 6,005,942 A | * | 12/1999 | Chan et al. ................. 713/187 |
| 6,058,193 A | * | 5/2000 | Cordery et al. ............. 380/284 |

* cited by examiner

Primary Examiner—Norman M. Wright
(74) Attorney, Agent, or Firm—Michaelson & Associates; Peter L. Michaelson

(57) ABSTRACT

Method and apparatuses for protectedly reading out an enciphered, cryptographic key ($K_{sec}$) stored in a first memory (2) of a first communication apparatus (8; 8'), comprising the following steps:
a. making available a first predetermined number (PW; X) by the first communication apparatus (8; 8');
b. receiving the first predetermined number (PW; X) by the second communication apparatus;
c. calculating a Message Authentication Code (MAC) by the second communication apparatus on a second predetermined number, using the first predetermined number (PW; X), and with the aid of a predetermined key ($K_{icc}$);
d. making available the Message Authentication Code by the second communication apparatus (6; 13);
e. deciphering the cryptographic key by the first communication apparatus (8; 8'), using the Message Authentication Code as a deciphering key.

16 Claims, 3 Drawing Sheets

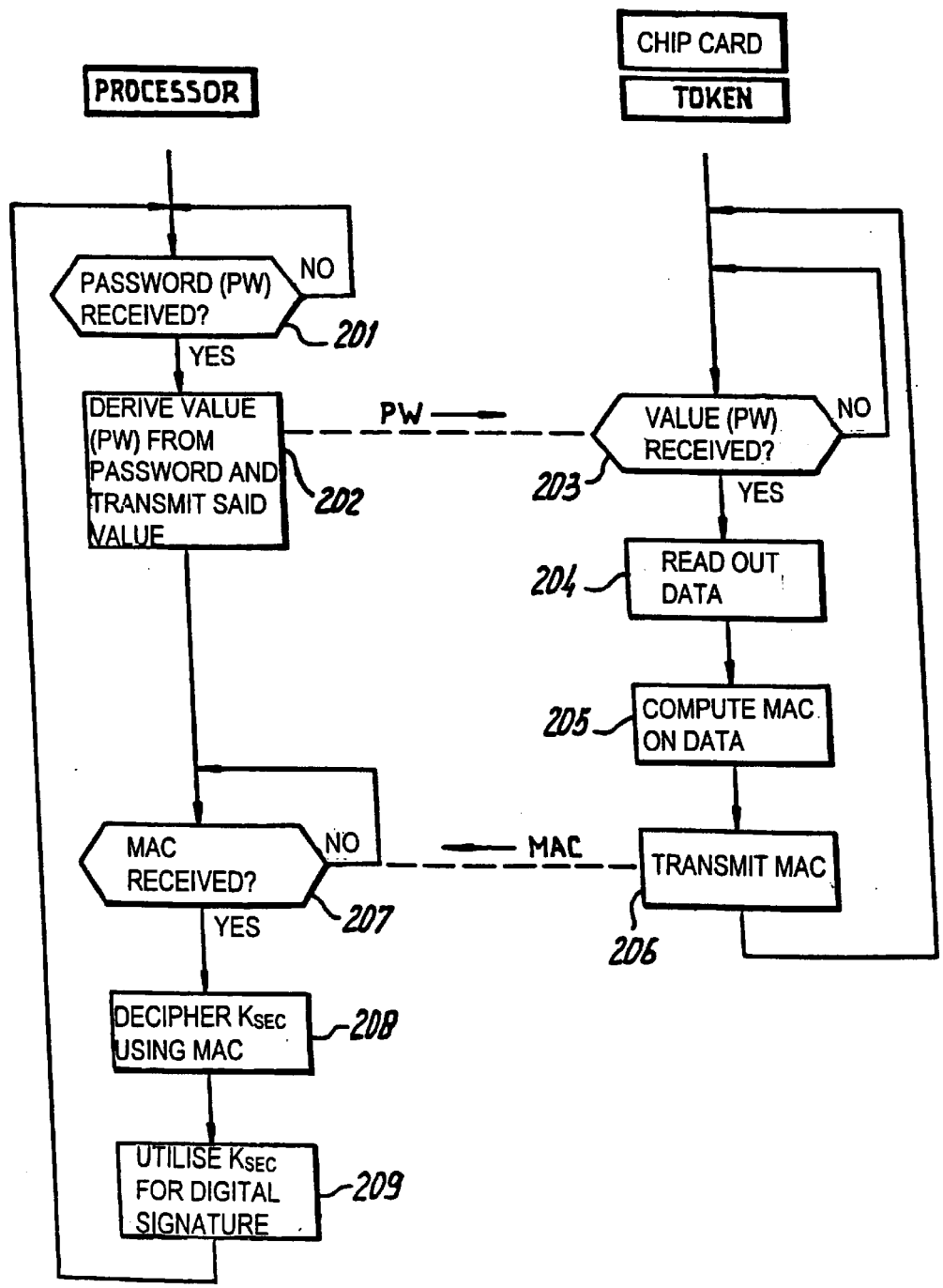

PROTECTEDLY READING OUT AN ENCIPHERED, CRYPTOGRAPHIC KEY

The present invention relates to the protectedly reading out of an enciphered, stored cryptographic key.

At present, for various telecommunication services a secret key is stored, enciphered, $K_{sec}$ at a user's on the hard disc of a computer of a user. The secret key $K_{sec}$ has then been stored in the so-called key store. For opening the key store or, in other words, deciphering the secret key $K_{sec}$, used another key $K_{key}$ is used. In practice, said other key $K_{key}$ is derived from a password entered by a user. The secret key $K_{sec}$ is then protected by way of the password, in other words, by something the user knows. The object of the present invention is to enhance the safety of the secret key $K_{sec}$.

European patent application 0 225 010 discloses a terminal for a system with which users may communicate with another party, e.g., a bank, in a protected manner. Said system ensures that the user can identify himself in a protected manner. For this purpose, the user enters his Personal Identification Number (PIN) at the terminal. In addition, the user lets the terminal read out a chip card of himself. From the chip card, the terminal reads out a chip-card key. The PIN is encoded with said chip-card key, as well as with a terminal key. The PIN encoded in this manner is transmitted to the bank. Further protection is realised by calculating, over the total message to be transmitted, a Message Authentication Code or MAC. In the present document, the MAC is used as a cryptographic check sum of the message, and is generated using the chip-card key and the terminal key. In this prior-art system, therefore, a message is transmitted using a terminal key stored on the terminal. In the prior-art system, the chip card is not used to additionally protect the access to the terminal key. Neither any use of the data-processing capacity of the chip card is made.

The European patent application 0 246 823 relates to a system in which a user can communicate, by way of a terminal, with, e.g., a bank computer. In this system, each user disposes of a personal calculation unit, e.g., a hand-held generator for generating a dynamic password, better known as a "token". The method disclosed in the present document comprises the following steps. Over a message to be transmitted by the terminal, there is calculated a MAC using a first cryptographic key stored in the terminal. The end result of the MAC is shown to the user on a display. The end result is a number, which is manually entered by the user on his personal calculation unit. From the MAC entered, the personal calculation unit calculates a new value using a second key. The second key is stored in the memory of the personal calculation unit, and is accessible only after the entry of a PIN by the user on his personal calculation unit. The personal calculation unit then shows the number calculated by it to the user on a display. The user enters said new number on the terminal. Subsequently, the computer of the terminal calculates a new MAC on the message to be transmitted, using the new number entered by the user. Said final MAC is transmitted, together with the message, to the computer of the bank. The final MAC thus functions as a digital signature on the message transmitted. In this known system, the first key, which is stored on the terminal, is not additionally protected. It may be directly read out for calculating the former MAC.

The former object, i.e., enhancing the safety of the secret key, according to the invention is achieved by way of a method for protectedly reading out an enciphered, cryptographic key stored in a first memory of a first communication apparatus, comprising the following steps:

a. making available a first predetermined number by the first communication apparatus to a second communication apparatus;

b. receiving the first predetermined number by the second communication apparatus;

c. calculating a Message Authentication Code by the second communication apparatus on a second predetermined number, using the first predetermined number and with the aid of a predetermined key;

d. making available the Message Authentication Code by the second communication apparatus to the first communication apparatus;

e. receiving the Message Authentication Code by the first communication apparatus;

f. deciphering the cryptographic key by the first communication apparatus, using the Message Authentication Code as a deciphering key.

Due to the method according to the invention, the cryptographic key stored in enciphered form in the first memory of the first communication apparatus can be read out only by using a MAC calculated by the second communication apparatus. In this respect, the access to the cryptographic key is further protected, since use has to be made of the computation capacity of the second communication apparatus.

In a first embodiment of the method according to the invention, the second communication apparatus is a chip card provided with contact pads, the first communication apparatus is provided with a card reader, and making available and receiving the first predetermined number, as well as making available and receiving the Message Authentication Code, take place by way of a physical communication link between the card reader and the contact pads of the chip card. The advantage of said first embodiment is that it is easy to implement, since ever more people have a chip card with them. In addition, in said first embodiment there cannot be made any mistakes, since the communication between the chip card and the first communication apparatus takes place fully automatically.

In an alternative embodiment of the method according to the invention, the second communication apparatus is a calculation unit provided with an input device for receiving the first predetermined number by the second communication apparatus, and the second communication apparatus is additionally provided with a monitor for making available the Message Authentication Code.

In the second embodiment, therefore, the second communication apparatus is not a chip card but a "token", which is available in a small size and therefore easy to take along. As compared to a chip card, however, the drawback is that said token must be taken along separately, while most people already have a chip card with them.

In the method defined above, in step a. a first predetermined number is made available by the first communication apparatus. In an embodiment according to the invention, said first predetermined number is equal to a first personal password, which is entered by the user into the first communication apparatus. In such an embodiment, therefore, the access to the cryptographic key is further protected by the first personal password of the user.

In an embodiment according to the invention, the aforementioned step c. takes place only after the user has entered a second personal password at the second communication apparatus. Said further step may take place both in the variant in which the user has entered a first personal password into the first communication apparatus, and in the main variant according to the invention, in which no use is made of a first, personal password.

The method according to the invention may be advantageously used when affixing digital signatures. That is why the invention also relates to the use of any of the methods defined above, the cryptographic key deciphered in this manner being used, after step f., for affixing a digital signature. Of course, the cryptographic key read out in this manner may also be used for other purposes.

For carrying out the method according to the invention, the invention provides for a communication apparatus provided with a memory having stored therein at least an enciphered, cryptographic key, a processor connected to the memory, and means for making available information, the processor being designed for carrying out the following steps:

a. making available a first predetermined number;
b. receiving a Message Authentication Code, which has been calculated by a second communication apparatus on a second predetermined number, using the first predetermined number, and with the aid of a predetermined key;
c. deciphering the cryptographic key, using the Message Authentication Code received as a deciphering key.

Such a communication apparatus may be, e.g., a personal computer of a user.

For the purpose of carrying out the method defined above, the communication apparatus defined above must be capable of communicating with a further communication apparatus which in addition is part of the present invention. That is why the present invention also relates to a communication apparatus provided with a memory, a processor connected to the memory, and means for receiving information, the processor being designed for carrying out the following steps:

a. receiving a first predetermined number;
b. calculating a Message Authentication Code on a second predetermined number, using the first predetermined number, and with the aid of a predetermined key;
c. making available the Message Authentication Code.

Said further communication apparatus is, e.g., a chip card, but may also be a token.

The present invention will be explained hereinbelow by reference to several figures which are not intended to limit the invention, but only as an illustration thereof.

FIGS. 2 & 3 show examples of methods in accordance with the present invention.

Figure 1A:
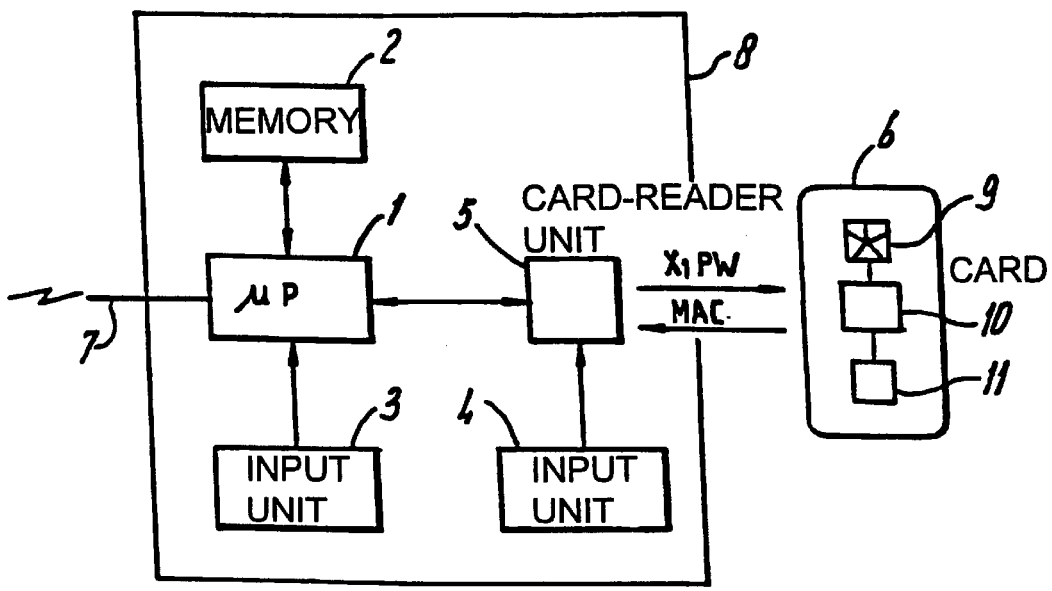
FIG. 1a shows a system of a first communication apparatus and a chip card, which are capable of communicating with one another.

FIG. 1a shows a communication apparatus 8 which is, e.g., a personal computer. The communication apparatus 8, however, may be any of the terminals in a telecommunications system. The communication apparatus may even be a stand-alone apparatus which has no other communication options than by way of a chip card, which is provided with the reference numeral 6 here.

The communication apparatus 8 comprises a processor 1, which is connected to a memory 2, a first input device 3, and a card reader 5. In the embodiment shown in FIG. 1a, the card reader 5 is connected to a second input device 4, the function of which will be explained in more detail hereinbelow. Although in FIG. 1a two separate input devices 3 and 4 are shown, it is possible to combine the two.

In FIG. 1a, there is further shown a chip card 6, which is provided with a processor 10, contact pads 9 connected to the processor 10, and a memory 11 connected to the processor 10. The chip card 6 may be brought into contact, in the usual manner, with the card reader 5, which then may make electric contact, in the known manner, with the contact pads 9 of the chip card 6.

As will still be explained in further detail hereinbelow, during operation the communication apparatus 8 will transmit a predetermined value X or a value PW derived from a password to the chip card 6, and the chip card 6 will later transmit a MAC to the communication apparatus 8.

Finally, the communication apparatus 8 may be provided with a connection 7 for communicating with other communication apparatuses. Of course, the connection 7 is intended to be schematic: it may denote any form of communication channel, either by way of a cable or wireless.

In the memory 2 of the communication apparatus 8, there is stored a secret key $K_{sec}$. In accordance with the invention, said secret key $K_{sec}$ may only be read out in a safe manner.

Figure 1B:
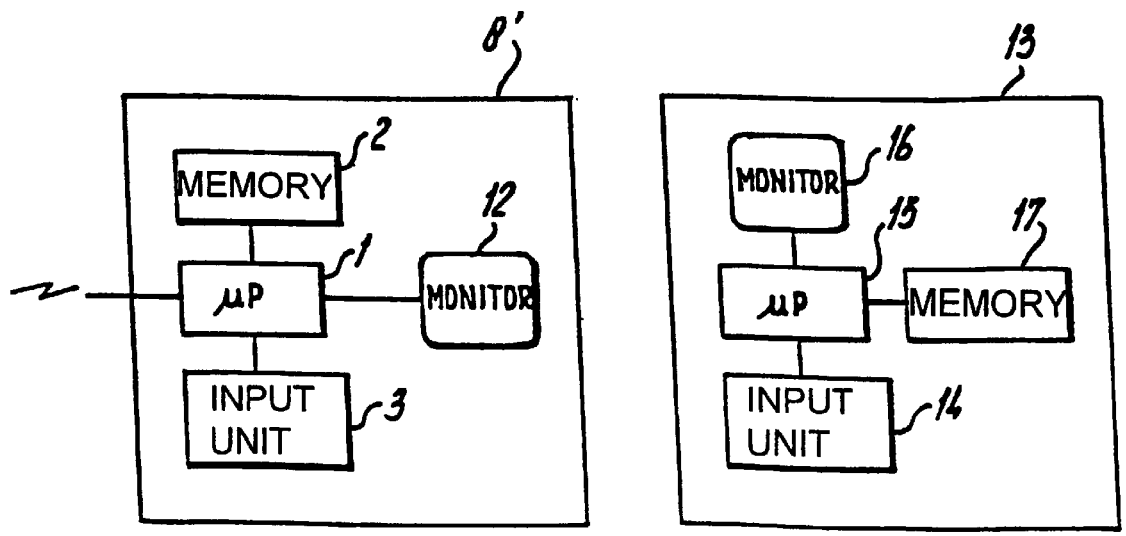
FIG. 1b shows a system of a first communication apparatus and a token, which together are capable of carrying out the method of the invention.

FIG. 1b shows an assembly of a communication apparatus 8' and a communication apparatus 13. In FIG. 1b, the same reference numerals denote the same parts as in FIG. 1a. The difference between the communication apparatuses 8 and 8' lies in the application of a monitor 12 in the event of the communication apparatus 8', which is connected to the processor 1.

In the example according to the invention, the communication apparatus 13 is a token, i.e., a manual calculation unit which, after the input of a specific number, will generate another number derived therefrom, and show it on its monitor 16. The token 13 comprises a processor 15, which is connected to a monitor 16, an input device 14, and a memory 17. The communication apparatuses 8' and 13 are not designed for direct communication with one another. For the communication, use must be made of a user, who reads a number from the monitor 12 and feeds said number to the communication apparatus 13 by way of input device 14, as well as reads a number from monitor 16 and feeds said number to the communication apparatus 8' by way of input device 3. Such will be explained in more detail hereinbelow.

FIG. 2 shows a first method in accordance with the invention for reading out the key $K_{sec}$. FIG. 2 includes a flow diagram on the left side and a flow diagram on the right side. The flow diagram on the left side is part of steps of the method which, during operation, will be carried out, by way of software, by the processor 1 of the communication apparatus 8, 8'. The flow diagram to the right in FIG. 2 is part of software which, during operation, will be carried out by the processor 10, 15 on the chip card 6 or on the token 13, as the case may be.

During operation, the processor 1 will wait for the receipt of a password by the user; step 201. For entering the password, the user may make use of the first input device 3. The first input device 3 may be, e.g., a keyboard or the like. The password may consist of a random series of letters and/or digits, but may also be derived from a signal of a sensor (not shown), with which a biological recognition may take place, e.g., fingerprint, iris pattern etc.

As soon as the user has entered his password, the processor 1 in step 202 transmits a value PW, derived from the password received, to the chip card 6 by way of the card reader 5. In the arrangement according to FIG. 1b, the processor 1 displays the value PW on the monitor 12, whereafter the user enters it at the token 13 by way of the input device 14.

The processor 10, 15 in step 203 waits until the value PW derived from the password has been received. Once this has been done, the processor 10, 15 in step 204 reads out the file contents of a preselected file in the memory 11, 17. In step 205, a MAC is calculated on the value PW, using a key $K_{icc}$ stored in memory 11, 17. In the event of the MAC calculation, the contents of a fixed value of a memory location in memory 11, 17 may be included as well. Said value may be, e.g., an identification number.

In step 206, the processor 10 of the chip card 6 returns the MAC calculated in this manner to the processor 1 of the communication apparatus 8 by way of the card reader 5. In the embodiment of FIG. 1*b*, the processor 15 transmits the calculated MAC to the monitor 16 in such a manner, that the user is able to read the MAC and feed it to the communication apparatus 8' by way of the input device 3.

Step 207 denotes that after step 202 the processor 1 of the communication apparatus 8, 8' waits until the MAC has been received.

Once such is the case, the processor 1 of the communication apparatus 8, 8' uses the MAC received as a deciphering key for protectedly reading out the secret key $K_{sec}$ from the memory 2.

After step 208, the secret key $K_{sec}$ read out in this manner is available for any purpose desired. In FIG. 2, an example is indicated, namely, that the secret key $K_{sec}$ is used for affixing a digital signature to a message to be transmitted by the communication apparatus 8. Affixing digital signatures is known from the prior art and need not be explained in further detail here.

Figure 3:
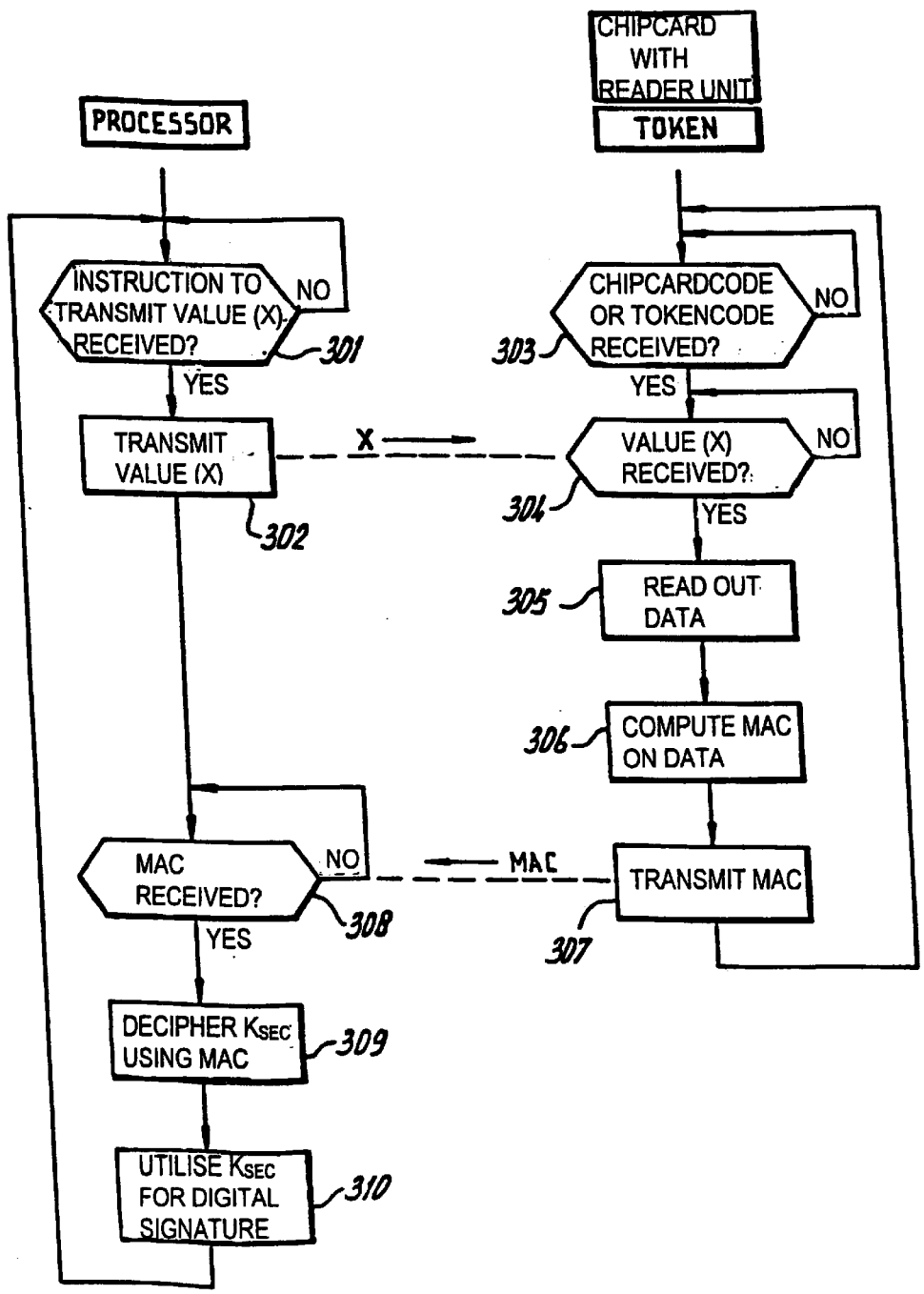

FIG. 3 shows an alternative method in accordance with the present invention. Once again, in the left-hand part of FIG. 3 a flow diagram is shown which may be implemented on the processor 1 of the communication apparatus 8, 8', e.g., by means of software. In the right-hand part of FIG. 3 a flow diagram is shown, which may be implemented in the processor 10, 15 of the chip card 6 or the token 13, respectively, using software.

In step 301, the processor 1 of the communication apparatus 8, 8' waits until it has received an instruction to make available a predetermined value X. The instruction to that end is given by the user, e.g., by using the input device 3. Once the processor 1 has received said instruction, the processor 1 in step 302 will transmit such predetermined value X. At that point in time, the predetermined value X will be read out from a fixed memory location having a fixed contents. In the embodiment of FIG. 1*a*, the value will be transmitted directly to the chip card 6. In the embodiment of FIG. 1*b*, the value of X will be displayed on monitor 12, whereafter the user must enter the value displayed at the token 13 by way of input device 14.

In step 303, the processor 10, 15 of the chip card 6 or the token 13, respectively, waits until it has received a chip-card code or token code from the user. In FIG. 1*a*, it is schematically indicated that the user may enter such a chip-card code by way of the card reader 5 having the second input device 4. The position of the second input device 4 is not of vital importance to the invention, however. Any location is suitable for such an input device 4. The chip card 6 may be replaced by, e.g., any other communication apparatus which itself is provided with its own input device, with which the user may enter such a code, which is fed to the processor 10. The function of the chip-card code is only to release the processor 10 of the chip card 6 for use. In the embodiment of FIG. 1*b*, the user enters the token code by way of input device 14.

As soon as the chip-card code or token code has been received, the processor 10, 15 continues with step 304, in which the processor 10, 15 tests whether the predetermined value X has already been received. If such is the case, the processor 10, 15 continues with step 305, in which the processor 10, 15 reads out the file contents of a preselected file in the memory 11, 17.

It should be noted that basically, the steps 303 and 304 may also be carried out in reverse order. The user entering the chip-card code or token code serves only to release the chip card 6 for use.

After step 305, a MAC in step 306 there is calculated by the processor 10, 15 on the value X using a key $K_{icc}$, stored in memory 11, 17. In the event of the MAC calculation, the contents of a fixed value of a memory location in memory 11, 17 may also be included. The MAC calculated in this manner is made available in step 307. In the arrangement according to FIG. 1*a*, the MAC is fed directly to the processor 1 of the communication apparatus 8 by way of the card reader 5. In the arrangement according to FIG. 1*b*, the value of the MAC is displayed on monitor 16, whereafter the user must enter said value by way of input device 3 at the communication apparatus 8'.

The steps 308, 309 and 310 in FIG. 3 correspond to the steps 207, 208 and 209, respectively, in FIG. 2 and require no further explanation here.

A major difference between the method according to FIG. 3 and that according to FIG. 2 is, that in the method as described above by reference to FIG. 3, the user need not feed a password to his personal computer, i.e., the communication apparatus 8. Since in many cases other people, too, have access to the use of a personal computer, it is safer to work with only the entry of a chip-card code or token code to the chip card 6 or the token 13, respectively.

It is also possible to combine the methods described above by reference to the figures FIGS. 2 and 3. In this case, the user feeds a password PW to both the processor 1 of the communication apparatus 8, 8' and a chip-card code or token code to the processor 10, 15 of a chip card 6 or the token 13, respectively. In step 301 (FIG. 3), the predetermined value X then becomes equal to the entered password PW. Although such requires the entry, by the user, of two numbers, such a combination may be desirable from a security viewpoint. It will be understood by those skilled in the art that the methods described above are intended only as an example of the invention. It is of vital importance to the invention to make use of the computational capacity of a second communication apparatus, e.g., the chip card 6 or the token 13, to calculate a MAC on a predetermined number or word, which MAC is then used to safely read out a cryptographic key $K_{sec}$ stored in an enciphered manner from the memory of a first communication apparatus 8.

We claim:

1. Method for protectedly reading out an enciphered, cryptographic key ($K_{sec}$) stored in a first memory (2) of a first communication apparatus (8; 8'), comprising the following steps:

a. making available a first predetermined number (PW; X) by the first communication apparatus (8; 8') to a second communication apparatus (6; 13);

b. receiving the first predetermined number (PW; X) by the second communication apparatus;

c. calculating a Message Authentication Code (MAC) by the second communication apparatus on a second predetermined number, using the first predetermined number (PW; X) and with the aid of a predetermined key ($K_{icc}$);

d. making available the Message Authentication Code by the second communication apparatus (6; 13) to the first communication apparatus (8; 8');

e. receiving the Message Authentication Code by the first communication apparatus (8; 8');

f. deciphering the cryptographic key by the first communication apparatus (8; 8'), using the Message Authentication Code as a deciphering key.

2. Method according to claim 1, characterised in that the second communication apparatus is a chip card (6) provided with contact pads (9), that the first communication apparatus is provided with a card reader (5), and that making available and receiving the first predetermined number (PW; X), as well as making available and receiving the Message Authentication Code, take place by way of a physical communication link between the card reader (5) and the contact pads of the chip card (6).

3. Method according to claim 1, characterised in that the second communication apparatus is a calculation unit (13) provided with an input device (14) for receiving the first predetermined number (PW; X) by the second communication apparatus, and that the second communication apparatus is additionally provided with a monitor (16) for making available the Message Authentication Code.

4. Method according to claim 1, characterised in that step a. comprises the following:

a'. receiving a first personal password (PW) from a user, and making available the personal password as the first predetermined number by the first communication apparatus (8; 8') to the second communication apparatus (6; 13).

5. Method according to claim 1, characterised in that step c. is carried out only after the second communication apparatus (6; 13) has received a second personal password from a user (step 303).

6. Method according to claim 1, characterised in that the second predetermined number is equal to the first predetermined number.

7. Method according to claim 1, characterised in that the second predetermined number is equal to the fixed contents of a predetermined memory location in the second communication apparatus.

8. Method for affixing digital signatures, using a method according to claim 1, characterised in that after step f. the cryptographic key deciphered in this manner is used for affixing a digital signature.

9. Communication apparatus (8; 8') provided with a memory (2) having stored therein at least an enciphered, cryptographic key ($K_{sec}$), a processor (1) connected to the memory, and means (5; 12) for making available-information, the processor (1) being designed for carrying out the following steps:

a. making available a first predetermined number (PW; X);

b. receiving a Message Authentication Code (MAC), which has been calculated by a second communication apparatus on a second predetermined number, using the first predetermined number (PW; X), and with the aid of a predetermined key ($K_{icc}$);

c. deciphering the cryptographic key, using the Message Authentication Code received as a deciphering key.

10. Communication apparatus according to claim 9, characterised in that it is further provided with input devices (3) for entering, by a user, a personal code (PW), and that the processor (1) is designed for carrying out the following in step a.:

a'. receiving a first personal password (PW) from a user, and making available the personal password as the first predetermined number by the first communication apparatus (8; 8') to the second communication apparatus (6; 13).

11. Communication apparatus according to claim 9, characterised in that the processor (1) is additionally designed for carrying out the next step after step f.: using the cryptographic key deciphered in this manner for affixing a digital signature.

12. Communication apparatus according to claim 9, characterised in that the communication apparatus (8) is further provided with a card reader (5) connected to the processor (1) for making available the first predetermined number (PW; X) and receiving a Message Authentication Code (MAC) from a chip card (6).

13. Communication apparatus according to claim 9, characterised in that the communication apparatus (8') is further provided with a monitor (12) connected to the processor (1) for making available the first predetermined number (PW; X) and an input device (3) for receiving a Message Authentication Code (MAC) from a chip card (6).

14. Communication apparatus (6; 13) provided with a memory (11; 17), a processor (10; 15) connected to the memory, and means (9; 14) for receiving information, the processor (10; 15) being designed for carrying out the following steps:

a. receiving a first predetermined number (PW; X);

b. calculating a Message Authentication Code (MAC) on a second predetermined number, using the first predetermined number (PW; X), and with the aid of a predetermined key ($K_{icc}$);

c. making available the Message Authentication Code.

15. Communication apparatus according to claim 14, characterised in that this is a chip card (6), which is provided with contact pads (9) for setting up a physical communication link with another communication apparatus, and receiving the first predetermined number (PW; X), as well as making available the Message Authentication Code.

16. Communication apparatus according to claim 14, characterised in that the processor (10) is designed for carrying out step c. only after a personal code has been received.

* * * * *